Oct. 6, 1959    H. W. LAWSON, JR    2,907,929
HIGH SPEED ELECTROMECHANICAL ACTUATOR
Filed Sept. 4, 1956
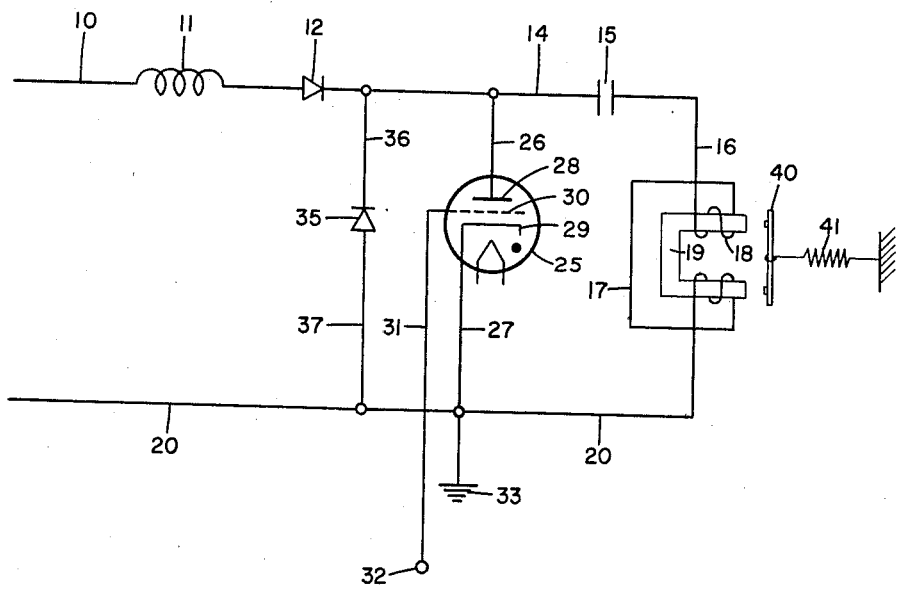
INVENTOR.
HARRY W. LAWSON, JR.
BY
ATTORNEY United States Patent Office 2,907,929
Patented Oct. 6, 1959

2,907,929

HIGH SPEED ELECTROMECHANICAL ACTUATOR

Harry W. Lawson, Jr., Avon, N.Y., assignor to Caledonia Electronics and Transformer Corporation, Caledonia, N.Y., a corporation of New York Application September 4, 1956, Serial No. 607,792

8 Claims. (Cl. 317—123)

The present invention relates to high speed actuators, and more particularly to a high speed electromechanical actuator.

The primary object of the present invention is to provide a high speed electromechanical transducer which will be reliable over a long life, compact, and relatively low in cost.

Other objects of the invention will be apparent hereinafter from the description, when taken in conjunction with the drawing, and from the recital of the appended claims.

The apparatus of the present invention has many applications where high speed operation is required. One application in which the apparatus has been used is for actuating the gates on the sorting mechanism of a punch card, or check sorting machine. There, the apparatus must actuate a plunger, getting it out of the way in 2.5 milliseconds.

One embodiment of the invention is illustrated in the accompanying drawing, the figure showing an electrical wiring diagram of apparatus built according to this one embodiment of the invention.

In the drawing, 10 denotes the positive lead from a direct current source of high voltage. The circuit from this source comprises the lead 10, a charging choke or inductor 11, a charging diode 12, line 14, a condenser or capacitor 15, line 16, the coil 18 of an electromagnet 17, and conductor 20 which leads back to the source of high voltage current.

A conventional thyratron 25 is connected to leads 14 and 20 by conductors 26 and 27, the plate 28 of the thyratron being connected to line 26, the cathode 29 of the thyratron being connected to line 27. Line 27 is grounded at 33. The control grid 30 of the thyratron is connected by a line 31 with a positive triggering means 32 which may be any suitable source of intermittent current, such as the secondary of a transformer. A diode 35 is connected by lines 36 and 37 to the lines 14 and 20 in parallel with the thyratron 25.

The electromagnet 17 comprises essentially the coil or coils 18 wound around a suitably laminated core 19, and an armature 40 which is normally held spaced from the core by means of a spring 41 or other conventional means such as a lever.

In operation, at any given time after the condenser 15 has attained full charge, the triggering charge for the thyratron can be injected at 32, causing the thyratron 25 to discharge the condenser 15 through lines 14 and 26, the thyratron 25, lines 27 and 20, the actuator coil 18, and line 16, thus causing the actuator coil to pull the armature 40 toward the core 19 against the resistance of the spring 41.

Since the condenser 15 and the actuator coil 18 comprise an oscillatory circuit, discharge current flows from the condenser through the thyratron 25 for one-half cycle, and then reverses its direction. In the remaining half cycle the current extinguishes the thyratron and deenergizes coil 18, flowing back to the condenser through line 16, the actuator coil 18, lines 20 and 37, the inverse diode 35, and leads 36 and 14, thereby recharging the condenser 15 towards its original charged state. Since the inductance of the actuator coil 18 is considerably less than that of the inductor 11 the charging circuit for condenser 15 consists primarily of inductor 11, diode 12, and lines 14, 16 and 20. Since the condenser 15 is charged from the supply source via inductor 11 the condenser 15 attains a voltage of twice the supply voltage, because the diode 12 serves to hold the charge on the condenser until such time as the thyratron 25 is fired.

Instead of either or both diodes 12 and 35, conventional dry disk rectifiers may be employed.

With a unit constructed as described, it has been possible to develop an acceleration of 950 g.'s and a peak velocity of 183 inches per second. In operating the gates in the sorting mechanism of a business machine, a force of 74 pounds moves a 1.25 ounce plunger .051 inch. The plunger moves 90% of this distance in only 0.5 millisecond, only one-fifth of the permissible time for operation of a gate.

While the invention has been described in connection with a particular embodiment thereof and a particular application therefor, it will be understood that it is capable of further modification; and this application is intended to cover any variations, uses, or adaptations of the invention following, in general, the principles of the invention, and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. An electromechanical high speed actuator comprising a source of high voltage, an inductor, a capacitor, the coil of an electromagnet, and means for holding the charge in said capacitor, all connected in series, switch means for shunting said capacitor and said electromagnetic coil into a separate series circuit to discharge said capacitor and energize said electromagnetic coil during one half of a cycle when said switch means is closed, means, including said capacitor, for automatically reopening said switch means, for deenergizing said electromagnetic coil, and for closing the first-named series circuit again to recharge said capacitor to a voltage no greater than the original voltage during the other half of the cycle.

2. An electromechanical high speed actuator comprising a direct current source of high voltage, an inductor, a capacitor, and the coil of an electromagnet, all connected in series, switch means for shunting said capacitor and said electromagnetic coil into an oscillatory series circuit to discharge said capacitor and energize said electromagnetic coil when said switch means is closed, means other than said switch means for completing a series circuit through said capacitor and said electromagnetic coil to recharge said capacitor to a voltage no greater than the original voltage and to deenergize said coil, and means for holding the charge in said capacitor until said switch means is actuated.

3. An electromechanical high speed actuator comprising a direct current source of high voltage, an inductor, a capacitor, and the coil of an electromagnet, all connected in series, the inductance of said electromagnetic coil being less than that of said inductor, means including an electronic valve for shunting said capacitor and said electromagnetic coil into a separate oscillatory series circuit for one-half cycle to discharge said capacitor and to energize said electromagnet when said electronic valve is triggered, means including a second electronic valve for completing a series circuit through said capacitor and said electromagnetic coil to deenergize said coil, extinguish said electronic valve and to recharge said capacitor to a voltage no greater than the original voltage during the other half cycle, and a third electronic valve connected in series with the first-named series circuit to hold the charge on said capacitor until the first-named electronic valve is triggered.

4. An electromechanical high speed actuator according to claim 3 in which the second and third electronic valves are diodes, and said first-named electronic valve is a thyratron.

5. An electromechanical high speed actuator comprising a source of high voltage, an inductor, a capacitor, the coil of an electromagnet, and means for holding the charge in said capacitor, all connected in series, means including an electronic valve for shunting said capacitor and said electromagnetic coil into an oscillatory series circuit for one-half of a cycle to discharge said capacitor and energize said electromagnet, and means operative during the other half cycle to extinguish said electronic valve and to deenergize said coil and recharge said capacitor to a voltage no greater than its original voltage, and means for preventing further operation of said oscillating circuit until said electronic valve has been triggered again.

6. An electromechanical high speed actuator according to claim 5 in which the means for preventing further operation of said oscillatory circuit comprises an electronic valve which will conduct in only one direction.

7. An electromechanical high speed actuator according to claim 5 in which the inductance of said electromagnetic coil is less than that of said inductor.

8. An electromechanical high speed actuator according to claim 6 in which the inductance of said electromagnetic coil is less than that of said inductor.

References Cited in the file of this patent

UNITED STATES PATENTS

| | | |
|---|---|---|
| 2,555,305 | Alty | June 5, 1951 |
| 2,786,970 | Connoy | Mar. 26, 1957 |

FOREIGN PATENTS

| | | |
|---|---|---|
| 110,173 | Australia | Apr. 4, 1940 |